United States Patent
Hubing et al.

(10) Patent No.: US 9,349,014 B1
(45) Date of Patent: May 24, 2016

(54) DETERMINING AN INDICATOR OF AGGREGATE, ONLINE SECURITY FITNESS

(71) Applicant: FMR LLC, Boston, MA (US)

(72) Inventors: Matthew James Hubing, Grapevine, TX (US); Prerak Patel, Irving, TX (US); Mason Ray Jackson, Watauga, TX (US); Thomas Phair Churchill, Salem, MA (US); Sai Krishna Reddy Gunna, Irving, TX (US); Theo Patrick Foley, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/604,512

(22) Filed: Jan. 23, 2015

(51) Int. Cl.
*G06F 21/57* (2013.01)
*G06F 21/30* (2013.01)
*G06F 21/31* (2013.01)

(52) U.S. Cl.
CPC ............ *G06F 21/577* (2013.01); *G06F 21/305* (2013.01); *G06F 21/316* (2013.01); *G06F 2221/033* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,589,203 B1* | 11/2013 | Collins | ................. | G06Q 10/00 705/7.12 |
| 8,600,751 B2* | 12/2013 | Kuppuswamy | ......... | G06F 21/32 704/231 |
| 8,635,662 B2* | 1/2014 | Lang | ....................... | G06F 21/31 709/229 |
| 8,706,648 B2* | 4/2014 | Bhola | ................. | H04L 63/1433 705/319 |
| 9,099,006 B2* | 8/2015 | Mudalige | ............... | B60W 10/00 |
| 9,122,867 B2* | 9/2015 | Keohane | ................. | G06F 21/46 |
| 9,195,985 B2* | 11/2015 | Domenica | ............. | G06Q 20/40 |

* cited by examiner

*Primary Examiner* — Beemnet Dada
(74) *Attorney, Agent, or Firm* — Fish & Richardson P.C.

(57) ABSTRACT

A computer-implemented method comprising: accessing, by one or more computer systems, internal security information indicative of customer account activity of a customer of an online resource; receiving, by one or more computer systems, external security information; calculating an online security fitness attribute that is indicative of an overall security level of the customer for accessing the online resource; generating, by the one or more computers systems, information indicative of one or more suggested actions to increase the online security fitness attribute, with a suggested action comprising information specifying an amount by which the online security fitness attribute increases following performance of the suggested action; receiving, from the client device, information indicative of performance of one of the one or more suggested actions; and re-calculating by the one or more computer systems the online security fitness attribute by increasing the online security fitness attribute in accordance with the performed, suggested action.

21 Claims, 10 Drawing Sheets

DETERMINING AN INDICATOR OF AGGREGATE, ONLINE SECURITY FITNESS

BACKGROUND

Internet security includes computer security specifically related to the Internet. Internet security establishes rules and measures to use against attacks over the Internet, because the Internet represents an insecure channel for exchanging information leading to a high risk of intrusion or fraud, such as phishing, e.g., an attempt to acquire sensitive information by masquerading as a trustworthy entity in a communication over the Internet.

SUMMARY

In an embodiment, a computer-implemented method comprises accessing, by one or more computer systems, internal security information indicative of customer account activity of a customer of an online resource; receiving, by one or more computer systems, external security information indicative of online behavior of the customer, a state of a client device of the customer, and/or a state of software installed on the client device; calculating, by the one or more computer systems based on the accessed and received security information, an online security fitness attribute that is indicative of an overall security level of the customer for accessing the online resource; generating, by the one or more computers systems, information indicative of one or more suggested actions to increase the online security fitness attribute, with a suggested action comprising information specifying an amount by which the online security fitness attribute increases following performance of the suggested action; receiving, from the client device, information indicative of performance of one of the one or more suggested actions; and re-calculating by the one or more computer systems the online security fitness attribute by increasing the online security fitness attribute in accordance with the performed, suggested action. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

External security information comprises one or more of information indicative of results of a security scan of the client device, third party plug-in information received from a third party plug-in on the client device, operating system information for the client device. The actions include aggregating the external security information with the internal security information to generate the online security fitness attribute. The actions include selecting, by the one or more computer systems, incentive information that represents one or more incentives to incentivize the customer to perform at least one of the one or more suggested actions. The actions include detecting an occurrence of a pre-defined event that represents a risk of compromised security; re-calculating the online security fitness attribute by decreasing the online security fitness attribute in accordance a value associated with the with the pre-defined event; and prompting the customer for verification information to confirm that a user requesting access to the online resource is an authorized user. The actions include receiving, from a device, authentication information, based on the prompting; determining, from the authentication information, whether the user requesting access to the online resource is an authorized user; when the requesting user is an authorized user, permitting the requesting user to access the online resource and increasing the online security fitness attribute by a predetermined amount; and when the requesting user is an unauthorized user, denying the requesting user access to the online resource and decreasing the online security fitness attribute by a predetermined amount. The actions include generating information for a graphical user interface that when rendered on a display device renders: a first visual representation of the online security fitness attribute; and second visual representations of the one or more suggested actions, with a second visual representation displaying a number of points by which the online security fitness attribute increases, following performance of an associated suggested action.

The actions include detecting an occurrence of unusual activity in the customer account; and generating a notification of the detected unusual activity. The actions include accessing a plurality of security fitness rules that comprise a computer scan rule, a third party plug-in rule, a customer behavior rule, and a weighting rule; wherein the computer scan rule specifies a first computer scan value when the client device has installed computer scanning software and a second computer scan value when the client device does not have installed computer scanning software; wherein the third party plug-in rule specifies values for different types of third party plug-in information received; wherein the customer behavior rule includes a mapping of customer behavior information to customer behavior values; and wherein the weighting rule specifies one of more weighted values to be applied to one or more of the computer scan values, values for the different types of third party plug-in information and customer behavior values. Generating the online security fitness attribute comprises: aggregating the first computer scan value or the second computer scan value, with one or more values for different types of third party plug-in information received, and with one or more customer behavior values, in accordance with the weighting rule. Generating the online security fitness attribute comprises: generating, based on one or more of the security fitness rules, the online security fitness attribute.

DETAILED DESCRIPTION

Described are techniques for producing a security indication of a system networked to online resource systems. The techniques involve scanning various online systems for segments of information that are used in generating a security fitness attribute that is indicative of an overall security level of the customer for accessing the online resource. There are various types of security fitness attributes, including, e.g., a security fitness score that is a numerical values that is indicative of an overall security level of the customer for accessing the online resource. Other types of attributes include indicators of an overall online security state of an online resource or of a particular user account accessible via the online resource.

Generally, an online resource includes information that is accessible over a network (the Internet or an intranet). There are various types of online resources, e.g., websites, web pages, information viewed via applications, and so forth.

Figure 1:
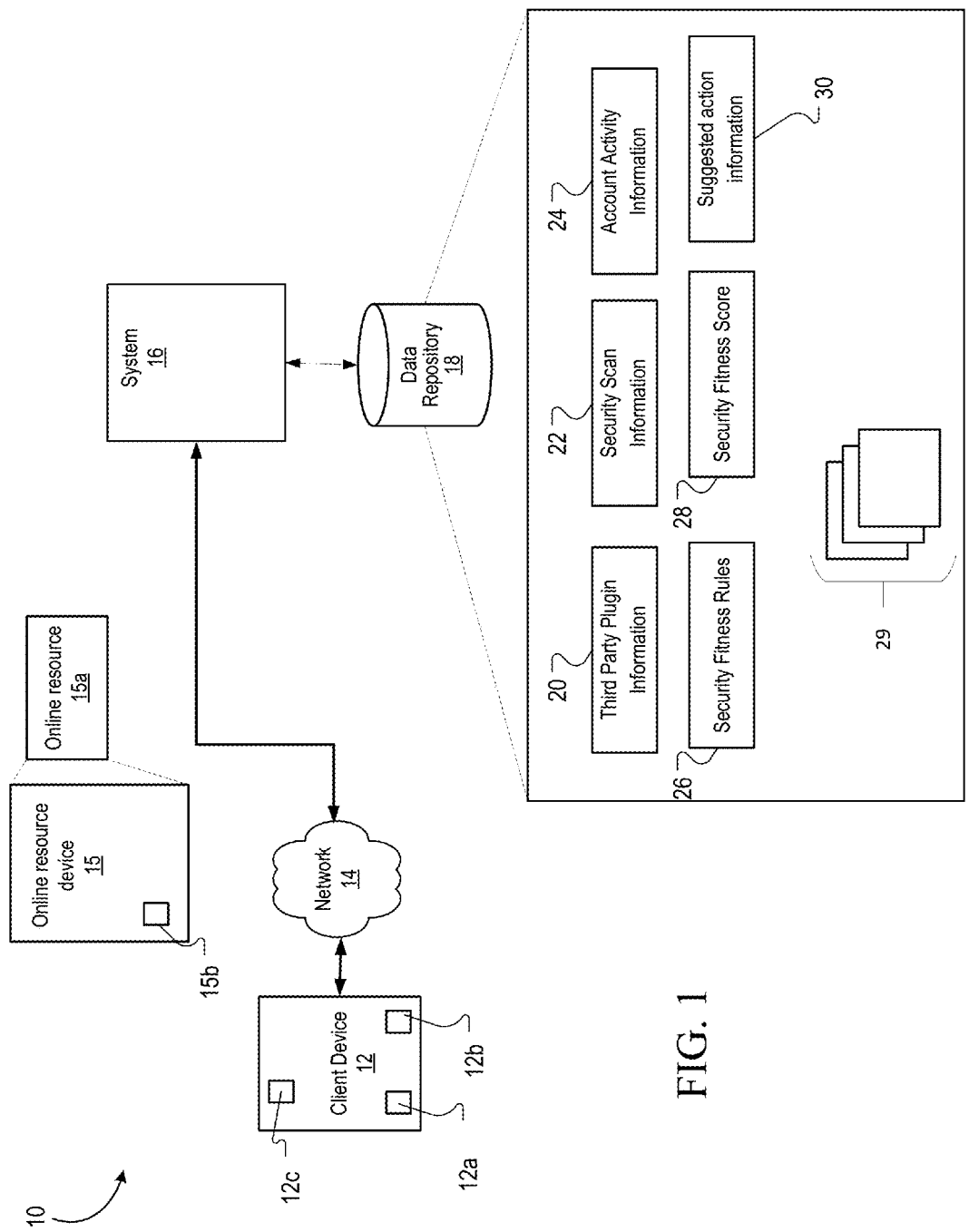
FIG. 1 is a diagram of a system for generating security fitness scores.

Referring to FIG. 1, a networked system 10 includes online resource device 15, system 16 for generating security fitness scores (i.e., a security fitness score system), client device 12 and data repository 18. System 16 is programmed to analyze external and internal information to generate online security fitness score. Online resource device 15 hosts online resource 15a that is accessible to the client device 12. Online resource device 15 stores user account information 15b that represents a user account (e.g., a user account of a user of client device 12) with an entity (e.g., a financial institution) that maintains online resource device. User account information 15b is accessible to a user (not shown) of client device 12 via online resource 15a.

System 16 generates security fitness score 28 by aggregating external information received via network 14 and internal information stored in data repository 18. External information is information that is received from one or more third-party entities that are outside of system 16. Internal information is information that is in system 16 already or is otherwise readily accessible by system 16. Internal information includes account activity information 24, i.e., information about user activity and user behavior with regard to the user account represented by user account information 15b. Account activity information 24 includes information that specifies at what times of day a user accesses the user account, from what Internet address the user accesses the user account, a hardware identifier that identifies a device from which the user accesses the user account, the date on which a personal identification number (PIN) for the user account was last updated, and other customer interactions with the user account. System 16 tracks interactions with the user account. Requests for user account interactions with on online resource 15a are routed to system 16. System 16 determines whether to allow or deny the requested user interaction. Online resource device 15 is configured for communication with system 16, such that requests to access a user account are initially routed to system 16 or are re-routed to system 16. Online resource device 15 also transmits other information to system 16, e.g., when a user last updated a PIN and geographic locations from which the user account is regularly accessed from.

There are also various other type of account activity information 24, e.g., such as Internet Protocol (IP) address that is used in determining whether a new request to access an account is coming from an authenticated IP address or an IP address that has previously, successfully accessed the account. Account activity information 24 also includes information indicative of a range of valid IP addresses that are authenticated for a particular user account. Account activity information 24 also includes information indicative of internet service providers (ISPs) that were used in previously accessing the account, e.g., to determine whether a new access request is received from a previously authorized ISP. Account activity information 24 also includes information specifying geographic locations (e.g., city, county, and so forth) from which the user's account has previously been accessed. System 16 determines if a new access request is coming from a previously identified and authenticated geographic location.

Account activity information 24 also includes information that is sourced from various components of system 16 and/or online resource device. Information from a legal team for the entity that maintains online resource device 15 is sourced to get information on location and account authorizations.

Once this initial information is sourced, system 16 tracks additional metrics such as logins (e.g., device, when and where logins occur, and which type of transactions were made). PIN/Password resets are tracked and used to influence the score, and negative habits (e.g., longer periods between resets) affect the security fitness score negatively. Information on call frequency is monitored and stored to protect a customer from unauthorized account access to a customer's account via phone. Once this information is stored, system 16 aggregates the information to dynamically adjust the score during a user session or from external influences.

Account activity information 24 is used in generating a profile of types of normal activity that an authorized user performs in an account. A user performing an action more than a specified number of time constitutes a normal activity (e.g., user usually (more than three times) uses a mobile device perform a first type of action in an account.

Using activity account information, system 16 detects unusual (e.g., not previously occurring) account activity and notifies a user of the detected unusual activity or prompts a user for additional information to verify that a user requesting access to the account is an authorized user. For example, a user usually logs in from her mobile device to perform a first type of action in an account, logs into her iPad to perform a second type of account action, and logs into her PC to perform a third type of account action. If this user attempts a second or third type of account action from her mobile device, system 16 requests additional authentication, as abnormal behavior could indicate a stolen mobile device. In another example, another user maintains an account with an institution that has been affected by a virus. System 16 received a notification of this virus and lowers the user's security fitness and notifies him of the breach, until positive security actions from the user occur (e.g., such as installing security scanning software on the user's mobile phone). Additionally, system 16 specifies a threshold security fitness score and prompts a user for additional authentication information when the actual security fitness score is less than the threshold score.

System 16 also collects external information, i.e., information that is received from client device 12, security scan information 22 that is received from security scan software 12a installed on client device 12, and/or third-party plug-in information 20 that is received from a third-party plug-in 12b on client device 12. Client device 12 executes a security fitness application 12c for viewing security fitness score 28. Through security fitness application 12c, a user of client device 12 requests access to account information 15b, with the request being routed to system 16 to assess the security level before granting access.

The security fitness application 12c communicates with third party plug-in 12b that is also installed on client device, because security fitness application 12c has an open Application Programming Interface (API) that allows for such communications. There are various types of third-party plug-in information 20, including, e.g., OS/Patch information, information indicative of a type of web browser and version, information indicative of 3rd Party Plug in version (PDF/Java/Flash/etc), a known Bad program check information, and information indicative of a check of security application/firewall. Third party plug-in 12b may be a social networking plug-in that allows a user to access a social network. Because third party plug-in 12b interfaces with security fitness application 12c, security fitness application 12c collects social networking information. A social network plugin (e.g., third party plug-in 12b) can be used to get the overall security of user on the internet. A compromised social network can mean further compromise when social log in is used or the same password is used for multiple account. The social network plugin sends to security fitness application 12c information indicative of the security of the social networking account (e.g., information specifying whether the social networking account has been hacked, when the password was changed, and so forth).

Third-party plug-in 12b may also be various other types of plug-ins, e.g., such as a system identifier plug-in that identifies aspects of client device 12, such as which operating system is installed on client device, internet protocol (IP) settings of client device 12, and so forth. Depending on the type of third-party plug-in, third party plug-in information includes social networking information, operating setting information and IP setting information.

Security fitness application 12c also interfaces with security scan software 12a to detect whether security scan software is installed on client device 12. If security scan software is installed on client device 12, security fitness application 12c retrieves from security scan software 12a information specifying if there are any known issues on client device 12, such as missing patches. Security scan software 12a also performs malware scanning, performs host file modification, checks for known malevolent application, and scans for web browser and operating system versions. Through the interface between security fitness application 12c and security scan software 12a, security scan software 12a passes security scan information 22 to security fitness application 12c. Security scan information 22 includes information indicative of the results of the scan and other information that security scan software 12a has identified.

Data repository 18 also stores suggested action information 30, e.g., information indicative of one or more suggested actions a user can perform to increase a security fitness scare. There are various types of suggested actions, e.g., adding a "selfie" (i.e., a user photograph) as a two-step authentication factor, scanning a user fingerprint into system 16, generating a stronger password, installing anti-virus software, learning about different types of viruses, adding an avatar (e.g., a picture) to an account, and so forth. A suggested action is associated with a specified number of points (e.g., a suggested action score) by which the security fitness score increases, e.g., upon performance of the action.

System 16 generates security fitness score 28 using security fitness rules 26, third party plug-in information 20, security scan information 22, account activity information 24, and number of points that are accorded to performed suggested actions. Security fitness rules 26 includes various different types of rules and an algorithm for computing security fitness score. Security fitness rules 26 include a computer scan rule, a third party plug-in rule, a customer behavior rule, and a weighting rule.

The computer scan rules specify various computer scan scores based on satisfaction of various conditions, as shown in the below Table 1.

TABLE 1

| Computer Scan Rules | |
| --- | --- |
| Condition | Computer Scan Scores |
| Security Scanning Software installed? | +5 |

TABLE 1-continued

| Computer Scan Rules | |
| --- | --- |
| Condition | Computer Scan Scores |
| Security Software not installed? | −5 |
| OS type 1? | +2 |
| OS type 2? | +1 |

As shown in the above Table 1, when system 16 detects that security scanning software is installed on client device 12, the computer scan rule specifies a computer scan score of a predefined value, i.e., +5. When system 16 detects that security scanning software is not installed on client device 12, the computer scan rule specifies another computer scan score of another predefined value, i.e., −5. When system 16 detects that client device 12 is running a operating system (OS) designated here as type 1, the computer scan rule specifies a computer scan score of +2. When system 16 detects that client device 12 is running an OS designated here as type 2, the computer scan rule specifies a computer scan score of +1. In this example, the system 16 is configured to recognize that the type 1 OS is marginally more secure than the type 2 OS. System 16 uses security scan information 22 in determining which conditions of the computer scan rules are satisfied. As described in further detail below, security fitness score 28 is generated based on an aggregation the computer scan scores.

The third party plug-in rules specify various third party plug-in scores based on satisfaction of various conditions, as shown in the below Table 2.

TABLE 2

| Third Party Plug-in Rules | |
| --- | --- |
| Condition | Third party plug-in score |
| Security Breach? | −2 |
| Lack of a security breach | +5 |
| Third party security score received? | Third party security score |

As shown in the above Table 2, the third party plug-in rules specify that when the third party plug-in detects a security breach (e.g., in the third-party website), the third party plug-in score is a predefined value (i.e., −2). The third party plug-in rules specify that when the third party plug-in detects a lack of security breach (e.g., in the third-party website), the third party plug-in score is a predefined value (i.e., +5). In some examples, the third party plug-in (or associated therewith) calculates its own security score and communicates this security score back to the security fitness application 12c. In this example, the third party plug-in score is the third party security score.

Third party applications use their own algorithm to determine their weighting on what comprises good security. For example, a third party plugin may weight the password for their service 3X more than a poor security question. Their algorithm would be run along with the others to affect the overall score, e.g., by being incorporated into the security fitness score.

The customer behavior rules specify various customer behavior scores based on satisfaction of various conditions, as shown in the below Table 3. System 16 uses account activity information in determining which conditions of the customer behavior rules are satisfied. As described in further detail below, security fitness score 28 is generated based on an aggregation of customer behavior scores.

TABLE 3

| Customer Behavior Rules | |
|---|---|
| Condition | Customer Behavior Scores |
| Customer login from unknown device | −2 |
| Customer login from known device | +2 |
| Customer login from outside of previously known login times | −3 |
| Customer login during previously known login times | +3 |
| PIN not reset for more than four months | −5 |
| PIN reset with the last four months | +5 |

As shown in the above Table 3, the customer behavior rules include a mapping of customer behavior information to customer behavior scores. When system 16 detects that a user (e.g., of client device 12) is attempting to login from an unknown device, the customer behavior rule specifies a customer behavior score of a predefined value, i.e., −2. To detect whether a device is known or unknown, system 16 stores in data repository 18 hardware identification information that identifies known, authorized devices. When a user of client device 12 is setting up an online account on online resource 15a, the user specifies which user devices are authorized by transmitting an International Mobile Station Equipment Identity (IMEI) number to online resource device 15 and/or to system 16. When online resource device 15 receives the IMEI number, online resource device 15 transmits it to system 16 for storage. System 16 stores the IMEI number in association with an account identifier for the account represented by account information 15b, e.g., to specify an authorized device for the account represented by account information 15b. When system 16 detects that a user (e.g., of client device 12) is attempting to login from a known device, the customer behavior rule specifies a customer behavior score of a predefined value, i.e., +2.

When system 16 detects that a user (e.g., of client device 12) is attempting to login from outside of previously known login times, the customer behavior rule specifies a customer behavior score of a predefined value, i.e., −3. When system 16 detects that a user (e.g., of client device 12) is attempting to login from inside of previously known login times, the customer behavior rule specifies a customer behavior score of a predefined value, i.e., +3. A known login time is a time of day (and/or a range of time) at which a user accesses the user account with increased frequency, relative to other times at which the user accesses the account. A known login time is also a time of day (and/or a range of time) at which a user accesses the user account at least a threshold number of times. For example, system 16 specifies that a user access an account at least four times within a same time range (e.g., 2-3 pm) for the time to be a known login time.

When system 16 detects that a user (e.g., of client device 12) is attempting to login from and the user's PIN has not been reset within a specified time period (e.g., four months), the customer behavior rule specifies a customer behavior score of a predefined value, i.e., −5. When system 16 detects that a user (e.g., of client device 12) is attempting to login from and the user's PIN has been reset within a specified time period (e.g., four months), the customer behavior rule specifies a customer behavior score of a predefined value, i.e., +5.

As shown in the below Table 4, system 16 weights the various scores, e.g., in generating security fitness score.

TABLE 4

| Weighting Rules | |
|---|---|
| Rule | Weight |
| Computer Scan Scores | $W_1 = 300\%$ |
| Third party plug-in scores | $W_2 = 100\%$ |
| Customer Behavior Scores | $W_3 = 200\%$ |

As shown in the above Table 4, weights for the various types of scores specify the importance of each score type in generating security fitness score 28. Computer scan scores are weighted three times as heavily as third party plug-ins scores. Customer behavior scores are weighted twice as heavily as third party plug-in scores. In a variation, individual scores are individually weighted. For example, weights are specified for the customer behavior scores that associated with different conditions, such that one customer behavior score is weighted more heavily than another customer behavior score associated with another condition.

System 16 generates security fitness score 28 using computer scan scores, third party plug-in scores, customer behavior scores, suggested action scores and weighted values, as shown in the below Table 5.

TABLE 5

Security Fitness Score =
$W_1$ (ΣComputer Scan Scores) +
$W_2$ (ΣThird party plug-in Scores) +
$W_3$ (ΣCustomer Behavior Scores) +
ΣSuggested Action Scores As shown in the above Table 5, the security fitness score is an aggregate of the weighted values of the computer scan scores, the weighted values of the third party plug-in scores, the weighted values of the customer behavior scores and the suggested action scores. In a variation, the suggested action scores may also be weighted, in accordance with specified weighted values. In still another variation, the security fitness score is generating by applying one or more mathematical operations to computer scan scores, the third party plug-in scores, the customer behavior scores and the suggested action scores.

System 16 adjusts a security fitness score by re-calculating the security fitness score and/or by increasing or decreasing a previously calculated security fitness score by a (weighted) value assigned to a new (or updated) computer scan score, third party plug-in score, customer behavior score and/or suggested action score. In a variation of FIG. 1, system 16 is integrated with online resource device, with the functionality of system 16 being run as a security fitness service on online resource device 15.

Data repository 18 also includes electronic records 29 (database records). Data repository 18 transforms electronic records 29 by inserting a security fitness score to generate formatted data records. Data repository 18 returns the formatted data records to system 16 to enable the security fitness score to be retrieved. In a variation, system 16 transforms the received external data and the accessed internal data by inserting the security fitness score directly into the external and internal data to generate a formatted data record with the security fitness score. These formatted data records are stored in data repository 18 and returned to system 16 to enable the security fitness score to be retrieved.

In a particular example, system 16 and client device 12 perform the operations shown in the below Table 6 in adjusting a security fitness score and in authenticating a user for accessing an account.

TABLE 6

1. User Logs In
2. Detect if login has occurred on same IP
3. If yes, confirm it is a verified device and proceed. If it is not verified, check if a flag has been set showing inconsistent login. SYSTEM ACTION: Prompt user to add device.
4. If no, validate IP range with previous logins
5. If the IP is designated with the same ISP and the same city, continue login.
6. If the IP is designated as the same ISP and the same county, continue login.
7. If the IP is designated as the different ISP and the same city, continue login but set a flag for followup.
8. If the IP is from a different state or city, check with the users previous login and ensure that it would have been possible to travel the distance in the time covered (e.g., logging in from Texas at 1pm and then New York at 2pm should not be possible). If this outside of the realm of possibility, set a flag. SYSTEM ACTION: If flag = true, require additional login authentication.
9. Validate the time-frame of login is during normal hours based on users previous history.
10. If normal, continue login
11. If not normal hours, ensure login in during the users normal waking hours based on their location (5:30am → 1am.) SYSTEM ACTION: Set a flag
12. If they are not waking hours, add additional authentication as the possibility of proxy is likely.
13. Mark up flags and rank based on severity. Update score to reflect new logins. If point drop is greater than a specified amount, require additional authentication for high risk transactions for the duration of the session.
14. If flags are present, rectify user to validate logins.

As shown in the above Table 6, a user attempts to log into an account by accessing the security fitness application on a client device. In response, system 16 performs operations 2-14 in determining if the attempted user login is consistent with attributes of other user logins (e.g., times of days, IP address from which the login is attempted, and so forth). When system 16 detects unusual account, system 16 adjusts the security fitness score downward, e.g., in accordance with the security fitness rules. If the decrease in the security fitness score is greater than a threshold amount, system 16 prompts the user for additional, authenticating information. Additionally, when system 16 detects abnormal activity, system 16 sets a system flag to specify that abnormal activity is detected. When system flags are present, system 16 prompts the user for additional information to validate the login.

A flag is set to indicate to the system that an irregular event has occurred. The flag is set to track how often these flags are raised. Multiple flags indicate that there is an attempt to compromise an account. The severity is assigned to indicate how likely an attempt to hack an account is (multiple password entry failures from an unusual location is higher severity than one missed login attempt). Once a severity is determined, further action may be required (such as additional questions or a lockdown of the account)

Figure 2:
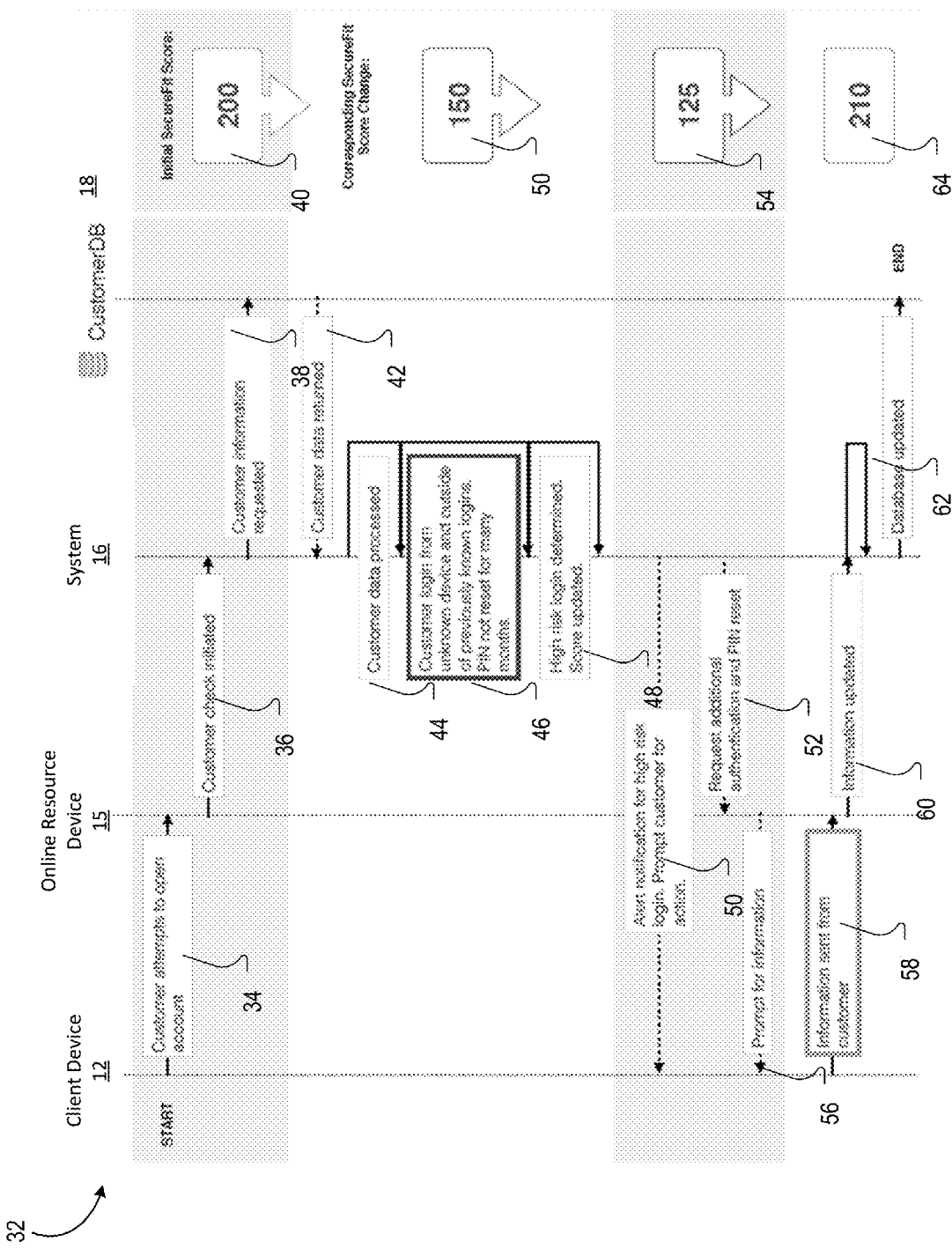
FIGS. 2 and 9 are flow diagrams of processes for generating security fitness scores.

Referring to FIG. 2, process 32 is implemented in updating a security fitness score. In operation, client device 12 requests (34) access to an account, e.g., a client account of the user associated with client device 12. Online resource device 15 receives the request and initiates (36) with system 16 a customer check to assess the online health and security of client device 12 that is requesting access. In response, system 16 requests (38) customer information (e.g., account activity information 24) from data repository 18.

In response to the request, data repository 18 returns (42) the customer information. Using the received customer information, system 16 calculates an initial security fitness score 40, e.g., based on customer behavior scores. The initial security fitness score is calculated based on whether the login is occurring from a previously identified Internet Protocol (IP) address, with a known Internet Service Provider (ISP) from a previously identified geographic location, is occurring during normal business hours, is occurring during hours when the user usually accesses the account and types of information included in the activity account information.

System 16 processes (44) the returned customer information and determines (46) that the customer is attempting to login from an unknown device that is outside of a range of devices that have previously been used for a login. System 16 also determines that the PIN has not been reset for at least a threshold number of months. Based on these determinations, system 16 identifies that a high risk login has occurred and adjusts the security fitness score to be adjusted security fitness score 50, e.g., using the security fitness rules.

System 16 determines that an attempted login is a high-risk login, when system 16 detects a threshold number of pre-defined risky activities, e.g., a user attempting to access an account outside of normal business hours, a user attempting to access an account from an authorized device, a user attempting to execute a trade type that deviates from trade types previously executed by the user, and so forth.

In response to determining that an attempted login is high risk, system 16 sends (50) an alert notification to client device 12 that prompts the customer for action, e.g., by sending (52) a request for additional information and PIN reset to online resource device 15, which in turn prompts (56) the customer this information. The security fitness score continues to decrease to security fitness score 54, until the user provides the requested additional information. There are various ways in which system 16 determines by how the security fitness score continues to decrease. One way is that the security fitness score decreases by a specified amount (e.g., 25 points) for each time interval (e.g., each hour) that the action is not completed. Client device 12 transmits (58) the requested information to online resource device 15, which updates (60) its system with the information and transmits (62) the information (or other information specifying the types of actions that the user performed) to system 16. Based on the actions the customer performed (e.g., updating a PIN), system 16 generates an updated security fitness score 64, in accordance with suggested action scores for the actions the customer performed.

Figure 3:
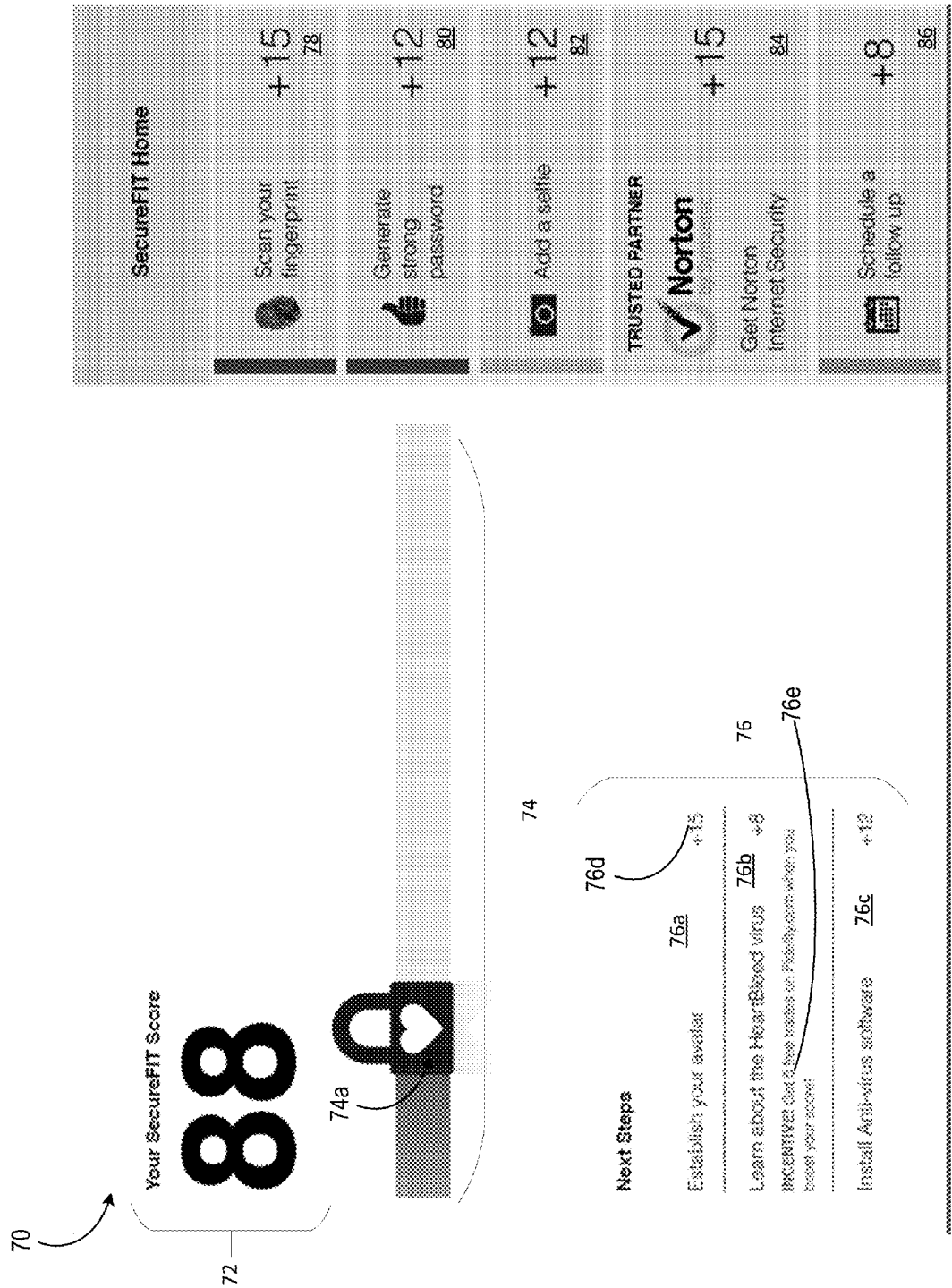
FIGS. 3-8 are graphical user interfaces provided by the system for generating security fitness scores.

Referring to FIG. 3, graphical user interface 70 displays visual representation 72 of a security fitness score. Graphical user interface 70 also display progress bar 74 that provides a visual indication of a user's progress in establishing a secure, online account. Icon 74a specifies wherein a range of potential security fitness scores a particular users' security fitness score falls.

Graphical user interface 70 includes portion 76 that displays next steps (e.g., suggested actions) a user could take to increase a security fitness score. Visual representation 76a specifies a suggesting action of establishing an avatar for an online account, to increase the security fitness score. Visual representation 76a includes information 76d specifying an amount (i.e., +15 points) by which the online security fitness score increases following performance of the suggested action of establishing an avatar. The association of an avatar with an online account increases online security, because when attempting to access the account that user can be prompted to select which avatar the user previously associated with the account.

Portion 76 also includes visual representation 76b of a suggested action of learning about a particular virus or online security risk. Visual representation 76b includes incentive information 76e that specifies an incentive (i.e., a number of free trades with a trading institution) for the user to complete the suggested action represented in visual representation 76b. Suggestions actions are associated with various types of incentives, e.g., a predefined percentage of cash back on purchases made with a payment card associated with an entity that maintains the customer account. Portion 76 also includes visual representation 76c of another suggested action of installing antivirus software on a client device to increase the security fitness score.

Graphical user interface 70 also includes visual representations 78, 80, 82, 84 and 86 of other suggested actions to increase the security fitness score. Visual representation 78 includes a suggested action of scanning a fingerprint into the system, e.g., such that a next time the user logs into the system the user is re-prompted for a finger print scan and the system determines whether the scanned finger print matches the previously stored fingerprint of an authorized user.

Visual representation 80 includes a suggested action in generating a stronger password for the customer account, e.g., by generating an alphanumeric password, by generating a password with symbols, and so forth. Visual representation 82 includes a suggested action of associating the customer account with a user picture (e.g., a selfie). After the selfie is added to the customer account, system 16 receives a graphical image of a user requesting access to the account. System 16 performs facial recognition on the graphical image to determine whether the selfie matches the received graphical image. When there is a match, this provides a strong indication that the user is an authorized user. When there is not a match, this indicates that the user is not an authorized user.

Visual representation 84 includes a suggested action of installing security scanning software on a client device to increase the security fitness score. Visual representation 86 includes a suggested action of scheduling a follow-up time to review the user's security fitness score and to review additional actions the user could take to increase the security fitness score.

Figure 4:
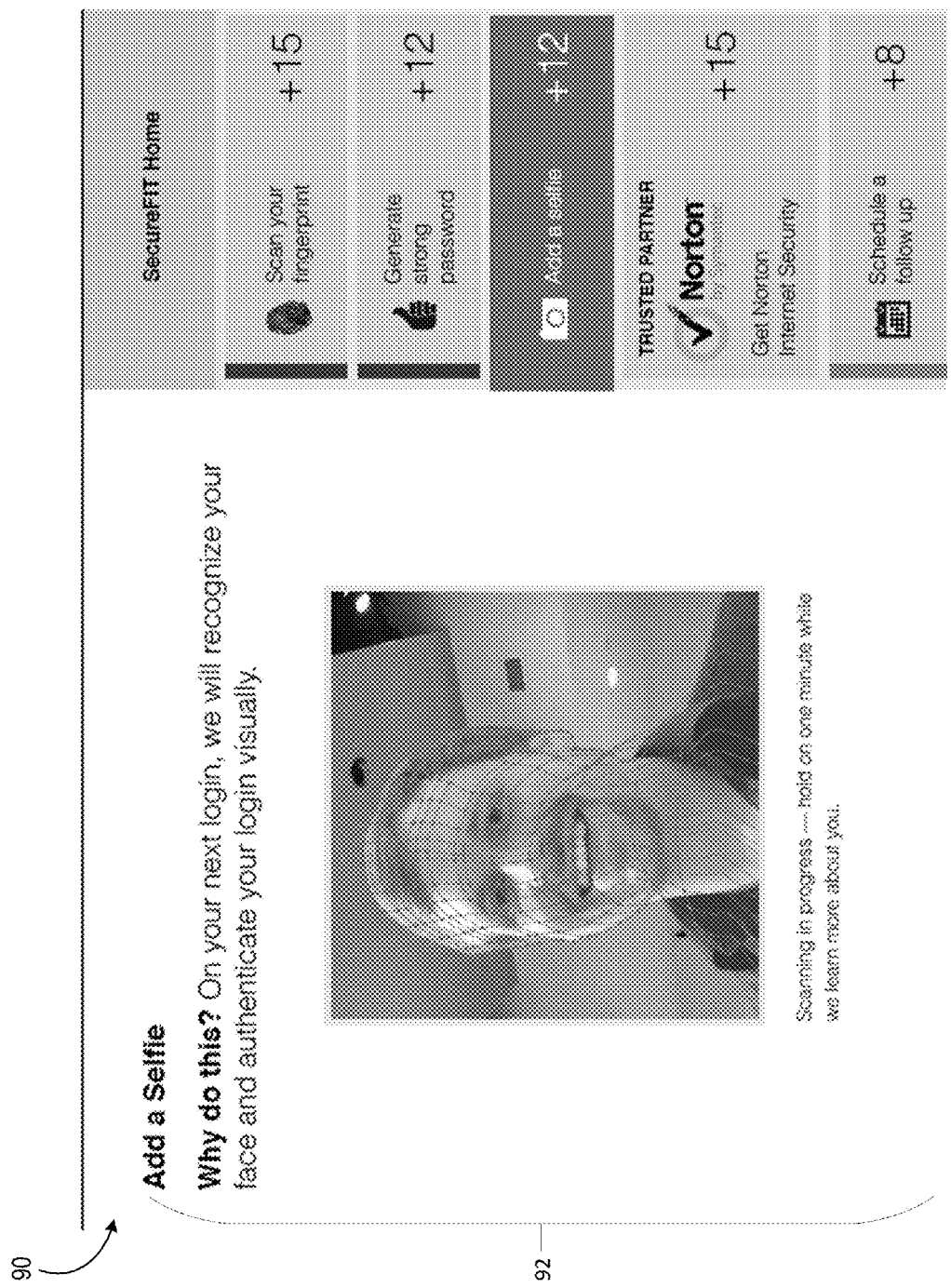

Referring to FIG. 4, graphical user interface 90 enables a user to associate a selfie with a customer account. Graphical user interface 90 includes portion 92 that displays a visual representation of the selfie and also displays information specifying a progress of scanning in the selfie.

Figure 5:
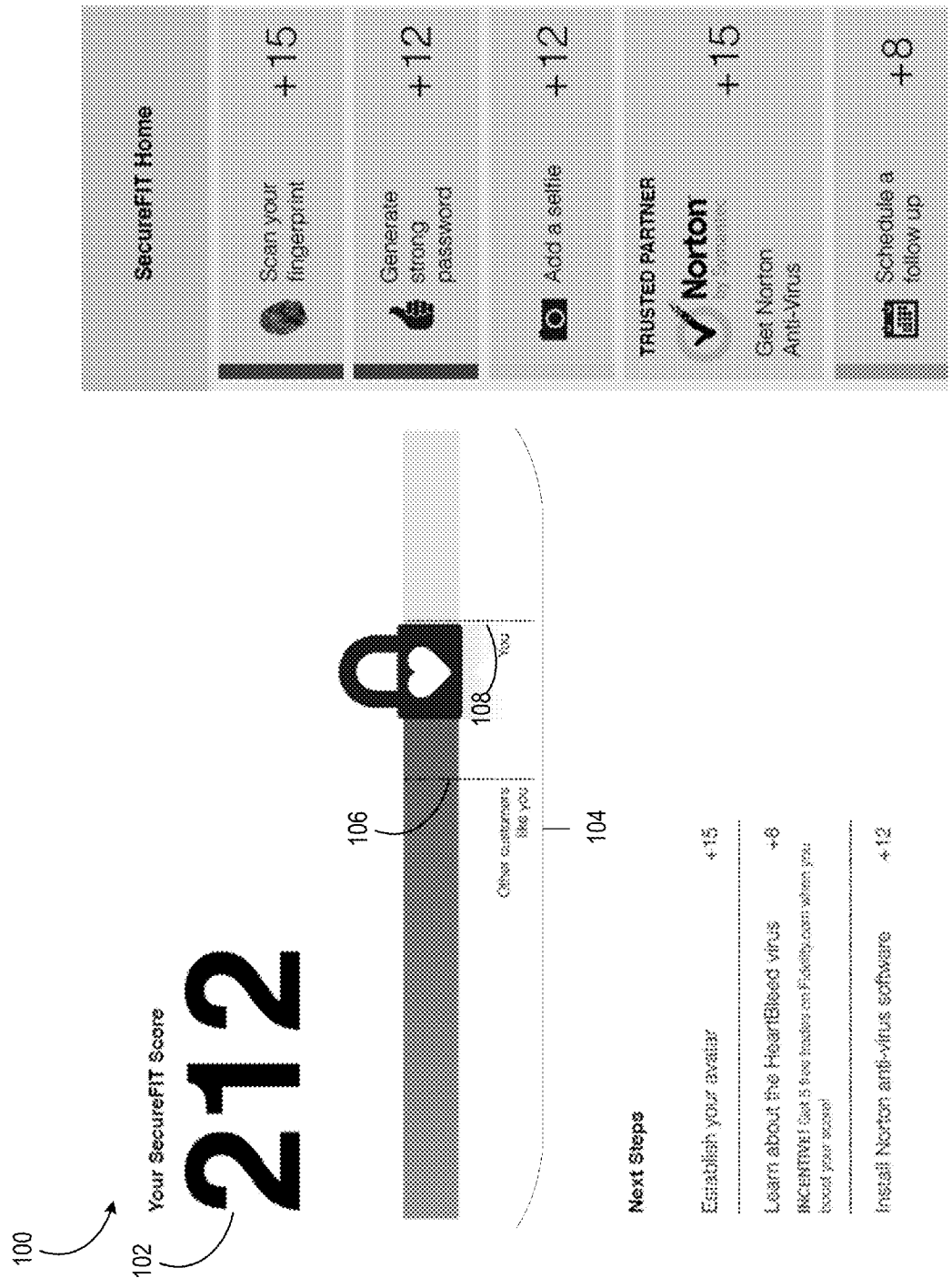

Referring to FIG. 5, graphical user interface 100 displays an updated security fitness score 102, following the user's performance of one of more of the suggested action. Graphical user interface 100 includes progress bar 104 to provide a visual representation of the security of a user's account, relative to the security of other user's account, and to provide a representation of where in a range of security fitness scores the user's security fitness score falls. Progress bar 104 includes benchmark representation 106 to represent a security fitness score (e.g., an average security fitness score) of other users with attributes and characteristics that are the same as or similar to the attributes and characteristics of the user associated with security fitness score 102. Progress bar 104 also includes indicator 108 to represent a proximity of the user's security fitness score 102 to benchmark representation 106.

Figure 6:
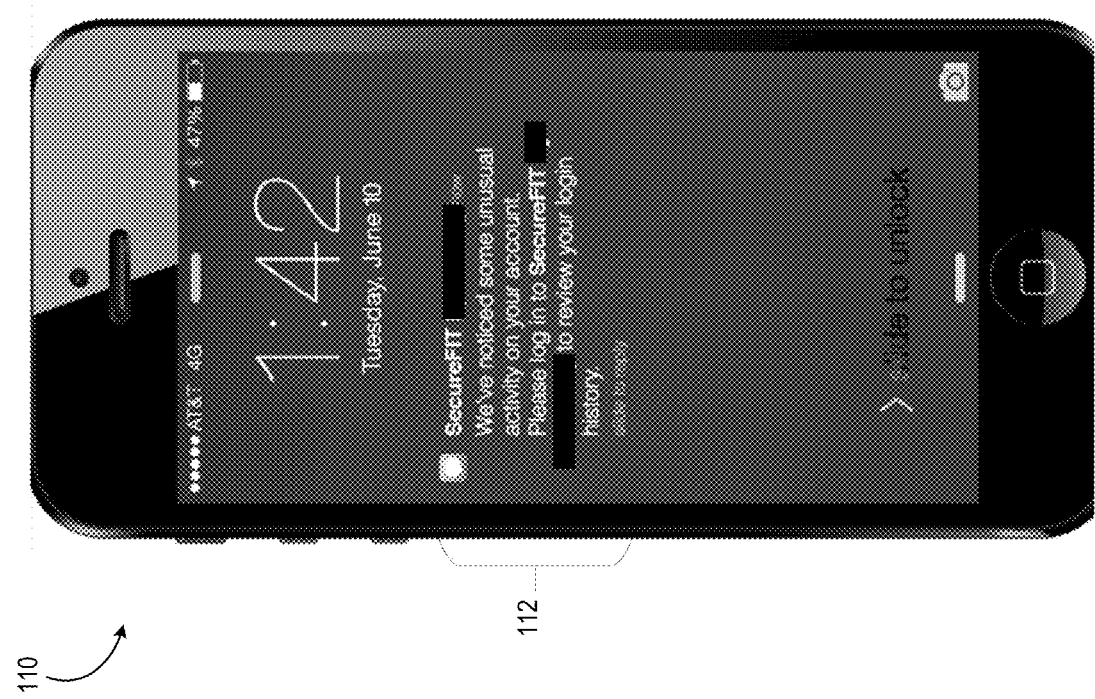

Referring to FIG. 6, graphical user interface 110 is displayed on an application (e.g., a security fitness application) that is dedicated to communication with system 16. Graphical user interface 110 displays notification 112, when system 16 detects unusual or abnormal account activity, as previously described.

Figure 7:
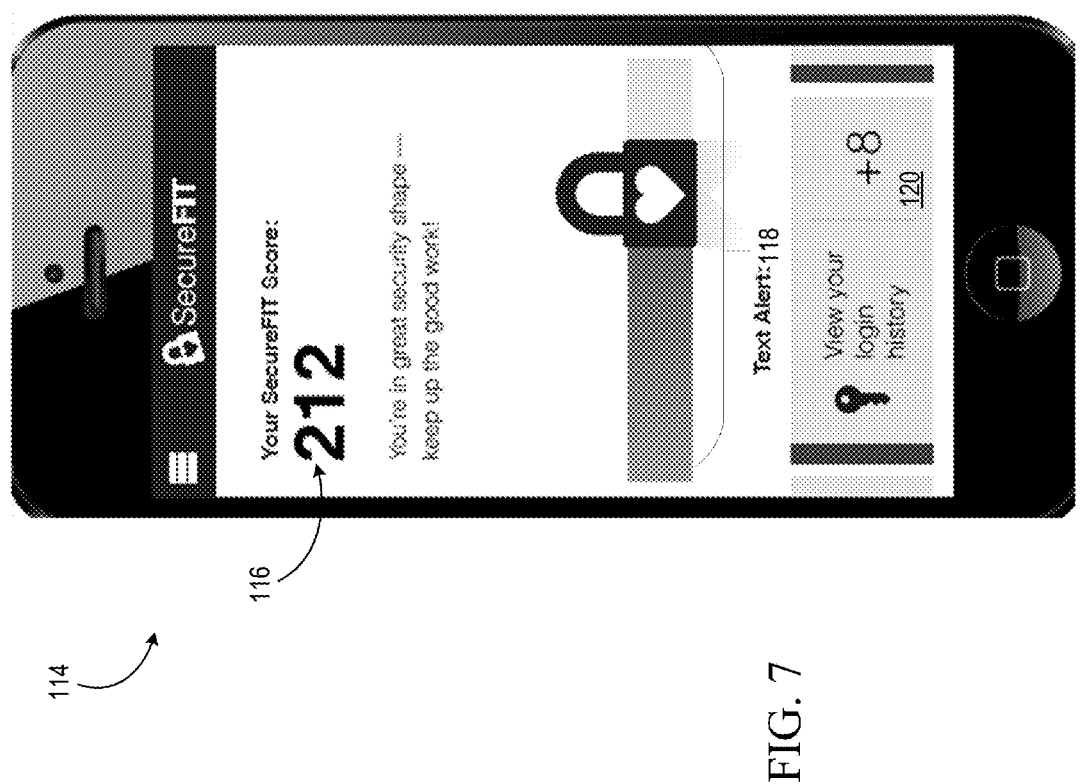

Referring to FIG. 7, graphical user interface 114 is displayed on the application that is dedicated to communication with system 16. Graphical user interface 114 includes visual representation 116 of a user's security fitness score. Graphical user interface 114 also includes progress bar 118 that represents a user's progress in establishing online security. Graphical user interface 114 also includes portion 120 that displays a text alert to notify a user of additional ways the user may increase the user's security fitness score. In this example, portion 120 indicates that the user's client device has received a text message that notifies that user that the user may increase the security fitness score by eight points by logging into the user's account to view the history.

Figure 8:
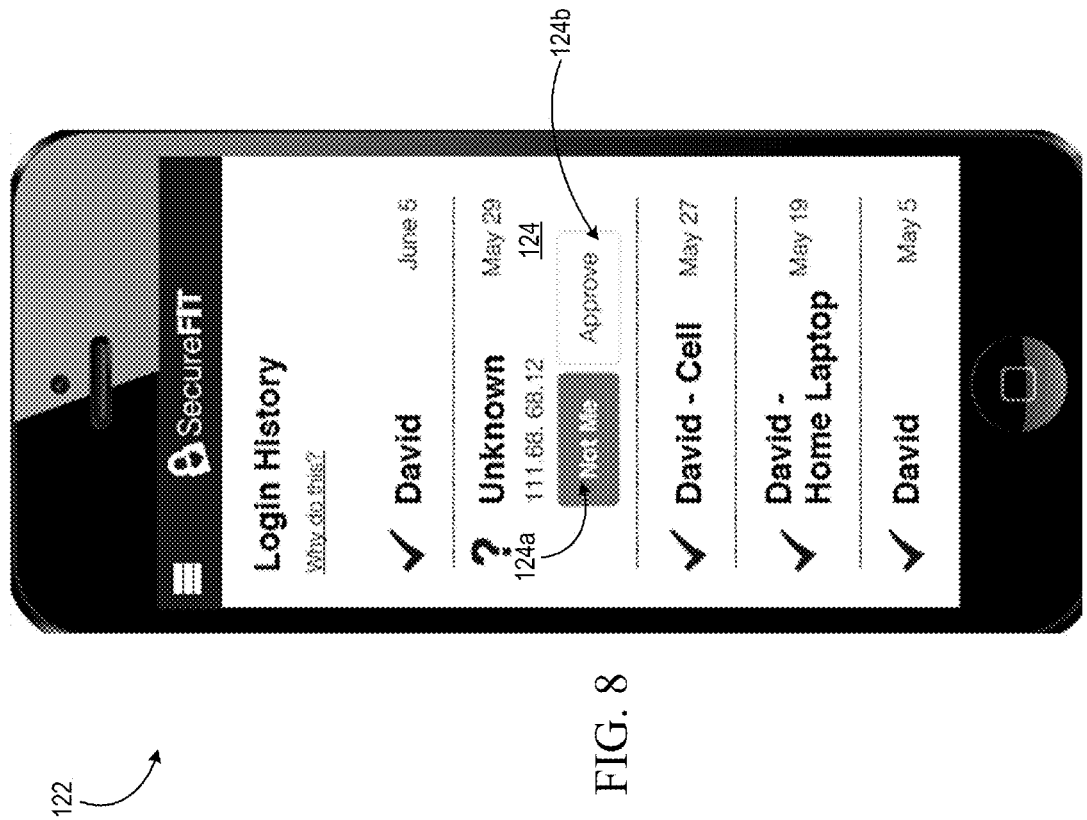

Referring to FIG. 8, graphical user interface 122 displays the user's login history to promote the user confirming that only authorized users have accessed the user's account. Graphical user interface 122 includes portion 124 to represents a login entry from an unknown user. There are various ways in which system 16 determines whether a user is known or unknown, including, e.g., by determining whether a login requests originates from a known (e.g., previously identified) IP address. Portion 124 includes control 124a, for a viewer (of graphical user interface 122) to specify that the user attempting to log into the account is an unknown user. Portion 124 also includes control 124b for the viewer to specify the user attempting to log into the account is an approved user. Upon selection of control 124a, the system 16 lowers the security fitness score and prompts the viewer to perform additional actions to increase the security of the account (e.g., by updating a password or a PIN).

Figure 9:
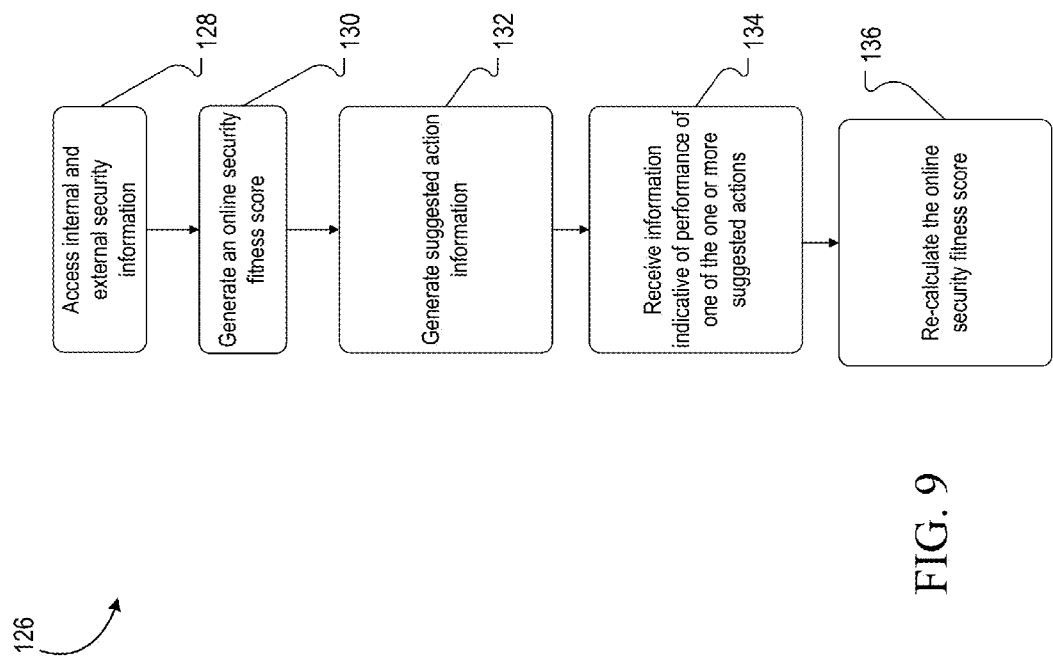

Referring to FIG. 9, system 16 executes process 126 in computing a security fitness score. In operation, system 16 accesses (128) internal security information indicative of customer account activity of a customer of an online resource and external security information indicative of online behavior of the customer, a state of a client device of the customer, or a state of software installed on the client device. System 16 generates (130), based on the accessed security information, an online security fitness score that is indicative of an overall amount of online security of the customer for accessing the online resource. System 16 also generates (132) information indicative of one or more suggested actions for increasing the online security fitness score, with a suggested action comprising information specifying an amount by which the online security fitness score increases following performance of the suggested action. System 16 receives (134) information indicative of performance of one of the one or more suggested actions. System 16 re-calculates (136) the online security fitness score by increasing the online security fitness score in accordance with the performed, suggested action, as previously described.

Figure 10:
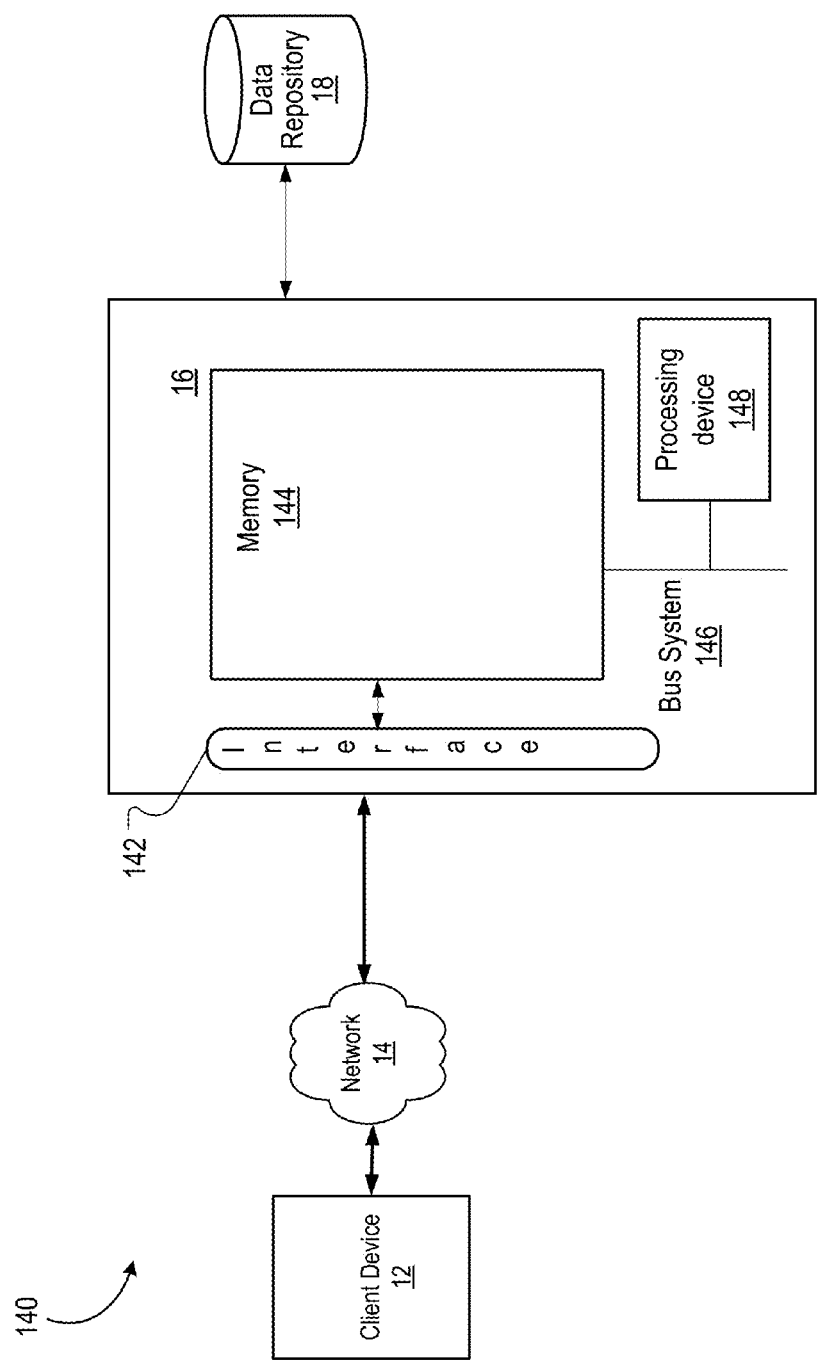
FIG. 10 is a diagram of components of the system for generating security fitness scores.

Referring to FIG. 10, client device 12 can be any sort of computing device capable of taking input from a user and communicating over network 14 with system and/or with other client devices. Client device 12 can be a mobile device, a desktop computer, a laptop, a cell phone, a personal digital assistant ("PDA"), a server, an embedded computing system, a mobile device and so forth.

System 16 can be any of a variety of computing devices capable of receiving information, such as a server, a distributed computing system, a desktop computer, a laptop, a cell phone, a rack-mounted server, and so forth. System 16 may be a single server or a group of servers that are at a same location or at different locations.

System 16 can receive information from client device 12 via interface 142, which is any type of interface capable of receiving information over a network, such as an Ethernet interface, a wireless networking interface, a fiber-optic networking interface, a modem, and so forth. System 16 also includes a processor 148 and memory 144. A bus system 146, including, for example, a data bus and a motherboard, can be used to establish and to control data communication between the components of system 16. Processor 148 may include one or more microprocessors. Generally, processor 148 may include any appropriate processor and/or logic that is capable of receiving and storing data, and of communicating over a network (not shown). Memory 144 can include a hard drive and a random access memory storage device, such as a dynamic random access memory, machine-readable media, or other types of non-transitory machine-readable hardware storage devices.

Embodiments can be implemented in digital electronic circuitry, or in computer hardware, firmware, software, or in combinations thereof. An apparatus can be implemented in a computer program product tangibly embodied or stored in a machine-readable hardware storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such Windows based platforms, Sun, Linux, Macintosh, etc. based platforms may also be used. Computer users can view information available on servers or networks on the Web through the use of browsing software, such as Firefox, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a."

A number of exemplary embodiments of the invention have been described. Nevertheless, it will be understood by one of ordinary skill in the art that various modifications may be made without departing from the spirit and scope of the techniques described herein.

What is claimed is:
1. A computer-implemented method comprising:
   accessing, by one or more computer systems, internal security information indicative of customer account activity of a customer of an online resource;
   receiving, by one or more computer systems, external security information indicative of online behavior of the customer, a state of a client device of the customer, and/or a state of software installed on the client device;
   calculating, by the one or more computer systems based on the accessed and received security information, an online security fitness attribute that is indicative of an overall security level of the customer for accessing the online resource;

generating, by the one or more computers systems, information indicative of one or more suggested actions to increase the online security fitness attribute, with a suggested action comprising information specifying an amount by which the online security fitness attribute increases following performance of the suggested action;

receiving, from the client device, information indicative of performance of one of the one or more suggested actions; and re-calculating by the one or more computer systems the online security fitness attribute by increasing the online security fitness attribute in accordance with the performed, suggested action.

2. The method of claim 1, wherein the external security information comprises one or more of information indicative of results of a security scan of the client device, third party plug-in information received from a third party plug-in on the client device, operating system information for the client device.

3. The method of claim 1, further comprising:
aggregating the external security information with the internal security information to generate the online security fitness attribute.

4. The method of claim 1, further comprising:
selecting, by the one or more computer systems, incentive information that represents one or more incentives to incentivize the customer to perform at least one of the one or more suggested actions.

5. The computer-implemented method of claim 1, further comprising:
detecting an occurrence of a pre-defined event that represents a risk of compromised security;
re-calculating the online security fitness attribute by decreasing the online security fitness attribute in accordance a value associated with the with the pre-defined event; and
prompting the customer for verification information to confirm that a user requesting access to the online resource is an authorized user.

6. The computer-implemented method of claim 5, further comprising:
receiving, from a device, authentication information, based on the prompting;
determining, from the authentication information, whether the user requesting access to the online resource is an authorized user;
when the requesting user is an authorized user,
  permitting the requesting user to access the online resource and increasing the online security fitness attribute by a predetermined amount; and
when the requesting user is an unauthorized user,
  denying the requesting user access to the online resource and decreasing the online security fitness attribute by a predetermined amount.

7. The computer-implemented method of claim 1, further comprising:
generating information for a graphical user interface that when rendered on a display device renders:
  a first visual representation of the online security fitness attribute; and
  second visual representations of the one or more suggested actions, with a second visual representation displaying a number of points by which the online security fitness attribute increases, following performance of an associated suggested action.

8. The computer-implemented method of claim 1, further comprising:
detecting an occurrence of unusual activity in the customer account; and
generating a notification of the detected unusual activity.

9. The computer-implemented method of claim 1, further comprising:
accessing a plurality of security fitness rules that comprise a computer scan rule, a third party plug-in rule, a customer behavior rule, and a weighting rule;
wherein the computer scan rule specifies a first computer scan value when the client device has installed computer scanning software and a second computer scan value when the client device does not have installed computer scanning software;
wherein the third party plug-in rule specifies values for different types of third party plug-in information received;
wherein the customer behavior rule includes a mapping of customer behavior information to customer behavior values; and
wherein the weighting rule specifies one of more weighted values to be applied to one or more of the computer scan values, values for the different types of third party plug-in information and customer behavior values.

10. The computer-implemented method of claim 9, wherein generating the online security fitness attribute comprises:
aggregating the first computer scan value or the second computer scan value, with one or more values for different types of third party plug-in information received, and with one or more customer behavior values, in accordance with the weighting rule.

11. The computer-implemented method of claim 9, wherein generating the online security fitness attribute comprises:
generating, based on one or more of the security fitness rules, the online security fitness attribute.

12. One or more machine-readable hardware storage devices storing instructions that are executable by one or more processing to perform operations comprising:
accessing internal security information indicative of customer account activity of a customer of an online resource;
receiving external security information indicative of online behavior of the customer, a state of a client device of the customer, and/or a state of software installed on the client device;
calculating, based on the accessed and received security information, an online security fitness attribute that is indicative of an overall security level of the customer for accessing the online resource;
generating information indicative of one or more suggested actions to increase the online security fitness attribute, with a suggested action comprising information specifying an amount by which the online security fitness attribute increases following performance of the suggested action;
receiving, from the client device, information indicative of performance of one of the one or more suggested actions; and
re-calculating the online security fitness attribute by increasing the online security fitness attribute in accordance with the performed, suggested action.

13. The one or more machine-readable hardware storage devices of claim 12, wherein the external security information comprises one or more of information indicative of results of a security scan of the client device, third party plug-in information received from a third party plug-in on the client device, operating system information for the client device.

14. The one or more machine-readable hardware storage devices of claim 12, wherein the operations further comprise:
detecting an occurrence of a pre-defined event that represents a risk of compromised security;
re-calculating the online security fitness attribute by decreasing the online security fitness attribute in accordance a value associated with the with the pre-defined event; and
prompting the customer for verification information to confirm that a user requesting access to the online resource is an authorized user.

15. The one or more machine-readable hardware storage devices of claim 12, wherein the operations further comprise:
generating information for a graphical user interface that when rendered on a display device renders:
a first visual representation of the online security fitness attribute; and
second visual representations of the one or more suggested actions, with a second visual representation displaying a number of points by which the online security fitness attribute increases, following performance of an associated suggested action.

16. The one or more machine-readable hardware storage devices of claim 12, wherein the operations further comprise:
accessing a plurality of security fitness rules that comprise a computer scan rule, a third party plug-in rule, a customer behavior rule, and a weighting rule;
wherein the computer scan rule specifies a first computer scan value when the client device has installed computer scanning software and a second computer scan value when the client device does not have installed computer scanning software;
wherein the third party plug-in rule specifies values for different types of third party plug-in information received;
wherein the customer behavior rule includes a mapping of customer behavior information to customer behavior values; and
wherein the weighting rule specifies one of more weighted values to be applied to one or more of the computer scan values, values for the different types of third party plug-in information and customer behavior values.

17. An electronic system comprising:
one or more processing devices; and
one or more machine-readable hardware storage devices storing instructions that are executable by one or more processing to perform operations comprising:
accessing internal security information indicative of customer account activity of a customer of an online resource;
receiving external security information indicative of online behavior of the customer, a state of a client device of the customer, and/or a state of software installed on the client device;
calculating, based on the accessed and received security information, an online security fitness attribute that is indicative of an overall security level of the customer for accessing the online resource;
generating information indicative of one or more suggested actions to increase the online security fitness attribute, with a suggested action comprising information specifying an amount by which the online security fitness attribute increases following performance of the suggested action;
receiving, from the client device, information indicative of performance of one of the one or more suggested actions; and
re-calculating the online security fitness attribute by increasing the online security fitness attribute in accordance with the performed, suggested action.

18. The electronic system of claim 17, wherein the external security information comprises one or more of information indicative of results of a security scan of the client device, third party plug-in information received from a third party plug-in on the client device, operating system information for the client device.

19. The electronic system of claim 17, wherein the operations further comprise:
detecting an occurrence of a pre-defined event that represents a risk of compromised security;
re-calculating the online security fitness attribute by decreasing the online security fitness attribute in accordance a value associated with the with the pre-defined event; and
prompting the customer for verification information to confirm that a user requesting access to the online resource is an authorized user.

20. The electronic system of claim 17, wherein the operations further comprise:
generating information for a graphical user interface that when rendered on a display device renders:
a first visual representation of the online security fitness attribute; and
second visual representations of the one or more suggested actions, with a second visual representation displaying a number of points by which the online security fitness attribute increases, following performance of an associated suggested action.

21. The electronic system of claim 17, wherein the operations further comprise:
accessing a plurality of security fitness rules that comprise a computer scan rule, a third party plug-in rule, a customer behavior rule, and a weighting rule;
wherein the computer scan rule specifies a first computer scan value when the client device has installed computer scanning software and a second computer scan value when the client device does not have installed computer scanning software;
wherein the third party plug-in rule specifies values for different types of third party plug-in information received;
wherein the customer behavior rule includes a mapping of customer behavior information to customer behavior values; and
wherein the weighting rule specifies one of more weighted values to be applied to one or more of the computer scan values, values for the different types of third party plug-in information and customer behavior values.

* * * * *